United States Patent [19]

Azad

[11] Patent Number: 4,740,983
[45] Date of Patent: Apr. 26, 1988

[54] LASER APPARATUS FOR MINIMIZING WAVEFRONT DISTORTION

[75] Inventor: Farzin H. Azad, Clifton Park, N.Y.

[73] Assignee: General Electric Company, Schenectady, N.Y.

[21] Appl. No.: 90,288

[22] Filed: Aug. 28, 1987

[51] Int. Cl.⁴ .............................................. H01S 3/06
[52] U.S. Cl. ...................................... 372/66; 372/35;
     372/99; 372/108; 372/92; 372/100
[58] Field of Search ................... 372/66, 34, 35, 98,
     372/99, 92, 108, 100

[56] References Cited

U.S. PATENT DOCUMENTS

| | | | |
|---|---|---|---|
| 3,102,920 | 9/1963 | Sirons | 88/1 |
| 3,140,451 | 2/1964 | Fox | 372/66 |
| 3,222,615 | 12/1965 | Holly | 372/66 |
| 3,308,395 | 3/1967 | Sorokin | 331/94.5 |
| 3,538,453 | 11/1970 | Miller | 331/94.5 |
| 3,560,872 | 2/1971 | Heimann | 331/94.5 |
| 3,633,126 | 1/1972 | Martin et al. | 331/94.5 |
| 3,636,473 | 1/1972 | Young | 331/94.5 |
| 3,743,962 | 7/1973 | Rosenberg | 331/94.5 |
| 4,175,830 | 11/1979 | Marié | 350/400 |
| 4,509,175 | 4/1985 | Daly et al. | 372/101 |
| 4,555,786 | 11/1985 | Byer | 372/70 |
| 4,617,669 | 10/1986 | Kuhn | 372/70 |

Primary Examiner—Léon Scott, Jr.
Attorney, Agent, or Firm—Richard V. Burgujian; James C. Davis, Jr.; Paul R. Webb, II

[57] ABSTRACT

Apparatus configured to minimize wavefront distortion of a coherent light beam is disclosed. The lasing medium of the laser apparatus has a hexagonal cross section and an internal surface with a circular cross section coaxial with a longitudinal axis of the lasing medium. The internal surface defines an interior space for receiving an optical pumping source. The external faces of the lasing medium are surrounded with a circumferential reflector and fluid coolant is flowed over the internal surface and external faces. The coherent light beam is passed through the lasing medium to follow a helical course totally internally reflecting off of the external faces.

17 Claims, 9 Drawing Sheets

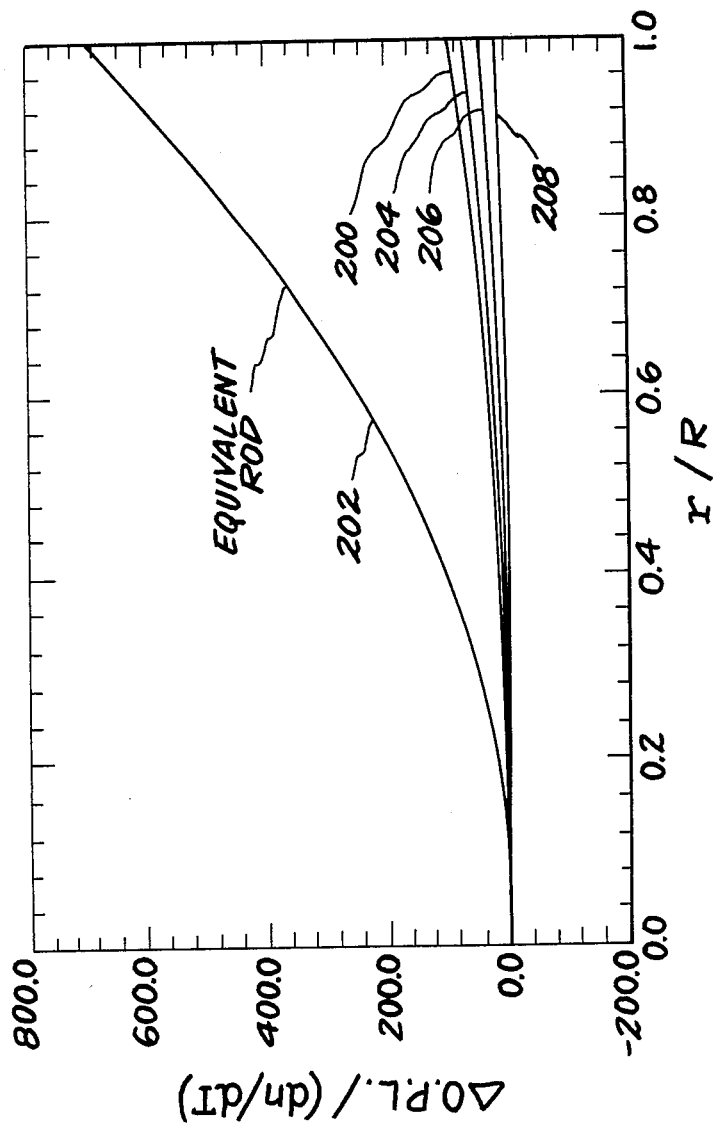

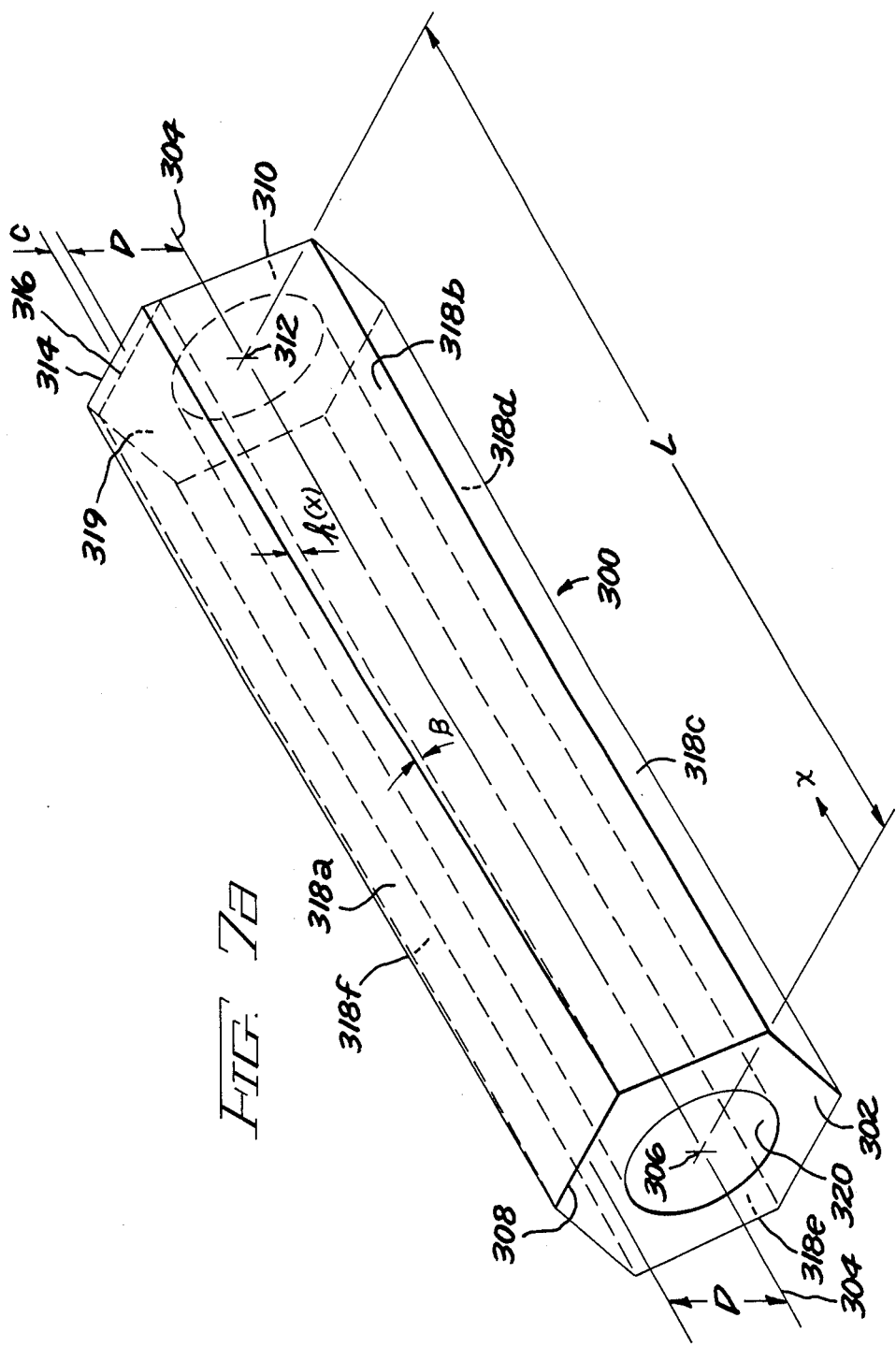

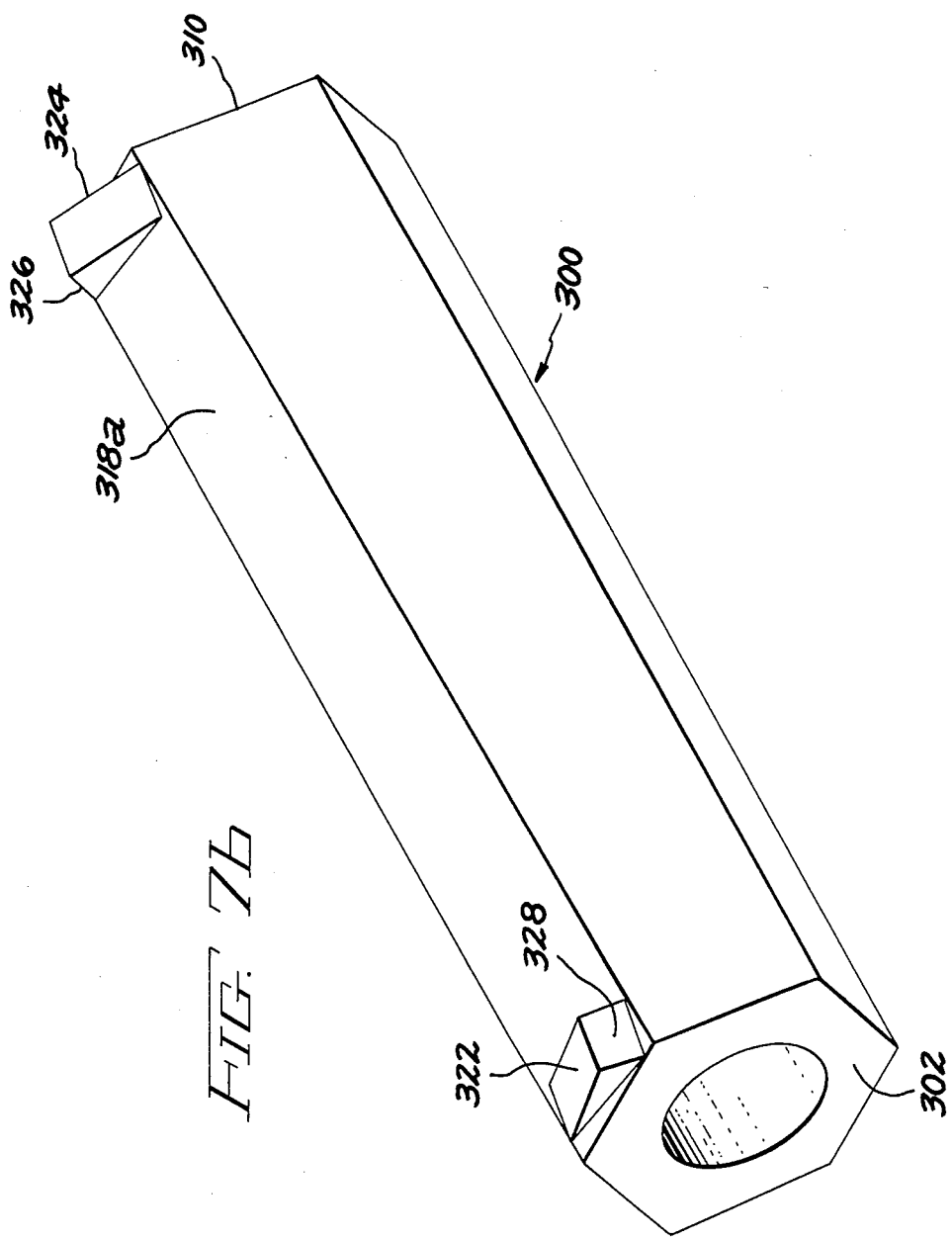

LASER APPARATUS FOR MINIMIZING WAVEFRONT DISTORTION

The present invention is related generally to lasers and, more specifically, to laser apparatus configured to minimize wavefront distortion of coherent light.

BACKGROUND OF THE INVENTION

The rod laser, well known in the art, includes a cylindrically configured lasing medium. In operation, the thermal gradients formed within the lasing medium by cooling the rod laser external surfaces, result in thermal distortion of the coherent light wavefront passing therethrough. This distortion takes the form of a positive lens effect and adversely affects both the operating efficiency of the rod laser as well as the quality of the beam delivered thereby.

One solution to the shortcomings of the rod laser is the laser device disclosed in commonly assigned U.S. Pat. No. 3,633,126, entitled "Multiple Internal Reflection Face-Pumped Laser" to Martin et al., the disclosure of which is incorporated in its entirety herein by reference. The lasing medium of the laser device disclosed in Martin et al. is generally configured as a slab. By multiply internally reflecting the coherent light beam within the slab between two optically plane surfaces bounding the slab thickness, thermal distortion in the thickness-wise dimension is substantially eliminated. However, in a width-wise dimension orthogonal to the thickness and defining the width of the optically plane slab surfaces, at least one of which is optically pumped and cooled, thermal distortion is experienced in regions near the edges of the slab width. This width-wise distortion is due in part to the difficulty of providing uniform optical pumping and cooling of the optically plane surface. In order to minimize such width-wise distortion, the Martin et al. disclosure prescribes excluding the coherent beam from passage through such edge regions. Thus, while the face-pumped laser effects a substantial improvement over the rod laser, it is restricted to utilizing less than the entire lasing medium slab in order to minimize the effects of width-wise wavefront distortion.

One solution to correcting the width-wise wavefront distortion experienced by the face-pumped laser is disclosed in copending, commonly assigned U.S. patent application Ser. No. 914,431 entitled "Method and Apparatus for Compensating for Wavefront Distortion in a Slab Laser". It would, however, be desirable to provide laser apparatus which overcomes the shortcomings of the rod laser, especially where such apparatus is configured differently from the face-pumped slab laser and not suffering from the width-wise wavefront distortion attendant thereto.

It is therefore a principal object of the present invention to provide laser apparatus which is not subject to the aforementioned thermal distortion problem of the rod laser.

It is an additional object of the present invention to provide laser apparatus which does not suffer the width-wise distortion of the above described face-pumped slab laser.

SUMMARY OF THE INVENTION

These and other objects are accomplished by the present invention which is directed to laser apparatus comprising a solid state lasing medium having a first and a second end and a longitudinal axis extending therebetween. The lasing medium has, in a first illustrated embodiment, a regular polygonal cross section perpendicular to the longitudinal axis and optically plane external faces extending between the first and second ends. The external faces correspond to the respective sides of the polygonal cross section. The lasing medium further includes an interior surface having a circular cross section and extending coaxially with the longitudinal axis to define an interior space.

The laser apparatus further includes optical pumping means, such as a cylindrical lamp, positioned in the lasing medium interior space for uniformly impinging exciting electromagnetic radiation upon the lasing medium. Means, such as a circumferential reflector, is positioned to confront the lasing medium external faces for uniformly reflecting thereon the exciting radiation provided by the pumping means and transmitted through the external faces. Cooling means are also provided for uniformly cooling the interior surface and the external faces of the lasing medium, the cooling action resulting in diverse thermal regions being created within the lasing medium. A first coolant channel is formed between the lasing medium interior surface and the lamp cylindrical surface and a second coolant channel is formed between the circumferential reflector and external faces.

The laser apparatus of the present invention additionally includes means for directing a beam of coherent electromagnetic radiation through the lasing medium at a selected angle to cause a total internal reflection off of each external face of the lasing medium and further to cause the coherent radiation to follow a helical course between predetermined locations near the first and second lasing medium ends. The individual rays of the coherent radiation pass through the diverse thermal regions in the lasing medium to average the optical path length traversed by each ray and thereby minimize distortion in a wavefront of the coherent radiation. The wavefront distortion is further minimized by modulating the relative temperatures of the coolants in the first and second coolant channels.

A second illustrated embodiment of the present invention differs from the first illustrated embodiment essentially in a modification of the lasing medium shape. The lasing medium of the second embodiment comprises a first end having a first N-sided regular polygonal cross section with a first center point and a second end having a second N-sided polygonal cross section with a second center point. The lasing medium has a longitudinal axis extending between the first and second center points and perpendicular to the first and second cross sections. Each side of the first cross section is a perpendicular distance D from the first center point. The second cross section differs from the first cross section only in that a first side of the second cross section is a perpendicular distance D+c from the second center point. Optically plane external faces extend between corresponding sides of the first and second cross sections of the first and second ends respectively. A first one of the faces extends between the first side of the second cross section and the corresponding side of the first cross section. The lasing medium of the second illustrated embodiment also includes an interior surface extending coaxially with the longitudinal axis to define an interior space for receiving the optical pumping lamp.

With the laser apparatus of the second illustrated embodiment otherwise generally configured as in the first illustrated embodiment, individual rays of a coherent electromagnetic radiation wavefront directed through the lasing medium at a selected angle totally internally reflect off the successive external faces of the lasing medium and progress through successive helical cycles along the longitudinal axis between first and second predetermined locations on the first face respectively near the first and second ends. For each successive helical cycle, the reflection point of each ray on each face is shifted in a first lateral direction relative to the reflection point thereon of the previous helical cycle. The lateral reflection point shift is in addition to a longitudinal shift thereof due to the helical progress. Upon constraining the individual rays of the coherent radiation wavefront between a first and a second half lateral portion of the first face at the first and second locations respectively, the individual rays of the wavefront experience substantially the same optical path length. As a result, the wavefront experiences substantially no distortion.

BRIEF DESCRIPTION OF THE DRAWINGS

While the specification concludes with claims defining the features of the invention that are regard as novel, it is believed that the invention, together with further objects thereof, will be better understood from a consideration of the following description in conjunction with the drawing figures, in which:

FIG. 6 is a graphical illustration of the further minimization of the wavefront distortion illustrated in FIG. 5 achieved by coolant temperature modulation;

FIGS. 7a and 7b illustrate a laser device of a second illustrated embodiment of the present invention.

DESCRIPTION OF THE INVENTION

Figure 1:
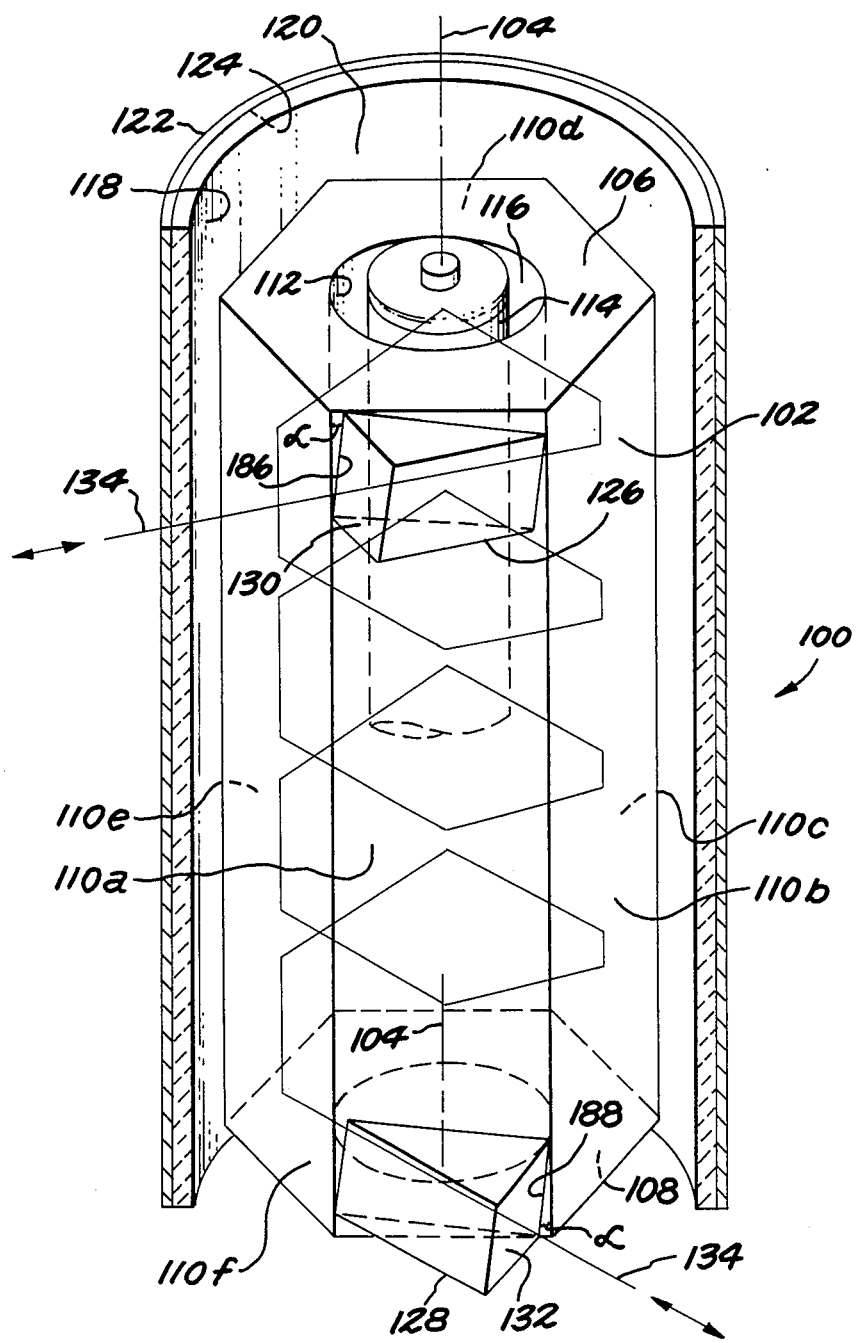
FIG. 1 illustrates a laser device of a first illustrated embodiment of the present invention.

Referring now to the drawings, FIG. 1 illustrates the present invention implemented, in a first illustrated embodiment, in an optically pumped laser device 100. Laser device 100 comprises a lasing medium 102 having a longitudinal axis 104 and a regular polygonal cross section in the form of a hexagon perpendicular to axis 104. Lasing medium 102 may comprise a homogeneous body of solid state lasing material such as yttrium aluminum garnet (YAG) doped with neodymium (Nd:YAG) or neodymium doped glass. Lasing medium 102 includes end surfaces 106 and 108 each having the hexagonal cross section. End surfaces 106,108 are only polished or ground to be sufficiently clear to not interfere with the optical pumping described hereinbelow.

Lasing medium 102 further includes six optically plane external faces 110a–110f each extending between end faces 106 and 108 and respectively corresponding to the six sides of the hexagonal cross section. The external faces are generally referred to herein by the reference numeral 110. Each face 110 is polished to within one-eighth of the wavelength of the coherent light emitted by lasing medium 102. The lasing medium includes an inner surface 112 having a circular cross section coaxial with axis 104. Inner surface 112 defines an interior space in which is positioned means, such as a lamp 114, for optically pumping lasing medium 102. Lamp 114 is preferably cylindrical in shape and positioned coaxially with axis 104. The lamp has a length at least coextensive with ends 106 and 108 so that the pumping electromagnetic radiation emitted by the lamp impinges uniformly over the entire area of interior surface 112, including those portions of that surface proximate ends 106 and 108. Lamp 114 may comprise a flash-type lamp emitting optical electromagnetic radiation at wavelengths suitable for exciting the atoms of lasing medium 102 to a metastable state. For example, a xenon flashlamp, which provides a pumping wavelength of between 5,000 and 9,000A is suitable for pumping a lasing medium composed of Nd:YAG or neodymium doped glass. With interior surface 112 and cylindrical lamp 114 being coaxial and lamp 114 selected to have a smaller diameter than the circular cross section of interior surface 112, an annular region is formed between the lamp and interior surface. This annular region which by geometry is substantially constant in cross section over the entire length of the lasing medium, forms a first coolant channel 116 for channeling, during device 100 operation, the flow of a fluid coolant over interior surface 112 of lasing medium 102. The fluid coolants may be liquid or gaseous, exemplary liquid coolants being water or liquid fluorocarbon (e.g. FC-75), while air and helium are exemplary gaseous coolants.

Device 100 further includes a circumferential flow tube 118, for example composed of clear glass, positioned to completely surround lasing medium 102. For clarity, only a portion of flow tube 118 is shown in FIG. 1. Flow tube 118 has a circular cross section and is coaxial with axis 104 so that a uniform second coolant channel 120 is formed between the flow tube and the external faces of lasing medium 102. As with first coolant channel 116, second channel 120 enables, during device 100 operation, channeling the flow of a fluid coolant over external faces 110 of the lasing medium. A circumferential reflector 122 is mounted coaxially with axis 104 and preferably in contact with flow tube 118. A reflecting surface 124 of reflector 122 confronts the external faces of lasing medium 102 so that pumping radiation emitted by lamp 114 that is transmitted through the external faces of lasing medium 102 is uniformly reflected back onto those faces. The length of reflector 122 is at least coextensive with lasing medium ends 106 and 108 to assure such uniform reflection over the entire length of the lasing medium including the portions of the external surfaces proximate the ends. Reflector 122 may be constructed from gold or silver plated brass.

External face 110a of the lasing medium includes two prisms 126 and 128 positioned thereon for introducing and extracting a beam of coherent light. The prisms are preferably formed as an integral part of the lasing medium. Prisms 126 and 128 respectively include faces 130 and 132 through which the coherent light beam may be introduced and/or extracted. As is described in greater detail below, the prisms are predeterminedly positioned so that the coherent light beam follows a helical course between prism faces 130 and 132 by totally internally reflecting off of each external face 110 of lasing medium 102. A path 134 of an exemplary single light ray following such a helical course between prism faces 130 and 132 is illustrated in FIG. 1. Access to the prism faces to enable introduction/extraction of a coherent light beam may be accomplished by, inter alia, providing appropriately positioned openings (not shown) in flow tube 118 and reflector 122.

In operation, with pumping lamp 114 operating and coolant being flowed through cooling channels 116 and 120, device 100 may be operated in either of two modes. In the first mode, device 100 may be operated as a laser oscillator which, as is well known in the art, relies on spontaneous emission within the lasing medium to initially form the coherent beam. In such a case, a 100 percent reflective mirror would be positioned in front of one of the two prisms faces 130,132 to reflect coherent radiation emitted therefrom back along the same helical course. A partially transmissive mirror would be positioned in front of the other prism face (neither mirror being illustrated in the Figures) to enable partial extraction of the coherent radiation and reflection of the non-extracted portion of radiation back along the helical course. In the second mode, device 100 can be operated as a laser amplifier in which the above described mirrors utilized for the laser oscillator are not used. A beam of coherent light is simply introduced through one of the prisms faces 130,132 and, having been amplified, extracted from the other face.

Figure 2:
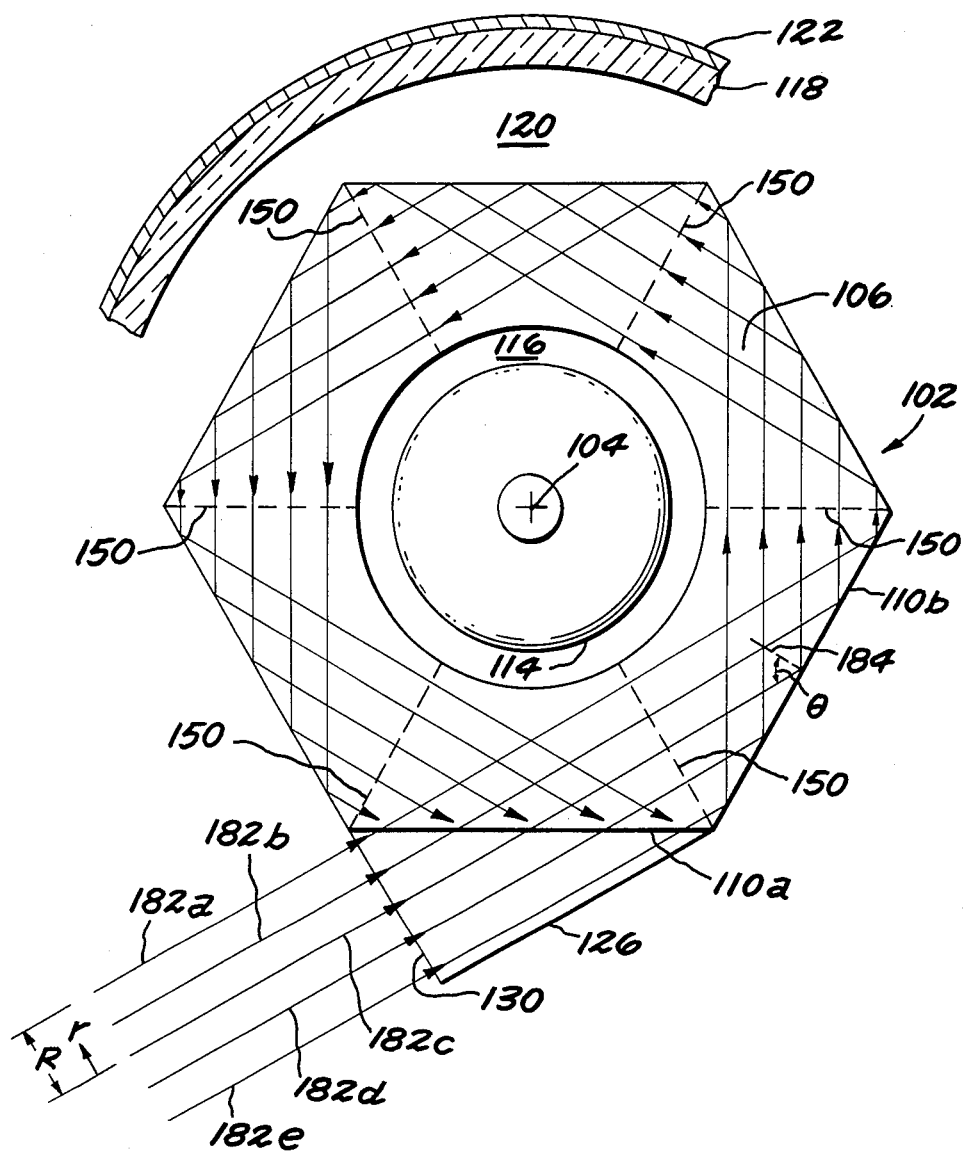
FIG. 2 is an end view of the laser device of FIG. 1.

The present invention as embodied in laser apparatus 100, solves the wavefront distortion problem experienced in the prior art rod laser in a manner different from the face-pumped laser solution disclosed in Martin et al. The wavefront distortion problem is solved by the present invention by provision of the lasing medium with a polygonal cross section, that cross section being a regular polygon in the form of a hexagon in the first illustrated embodiment. Regular polygon as used herein refers to a multi-sided plane geometric shape having sides of equal length and equal internal vertex angles. Hexagon, as used herein, is a six-sided regular polygon. The hexagonal cross section of lasing medium 102 is shown in FIG. 2 which illustrates lasing medium 102 as viewed from end 106. By bisecting each of the interior vertex angles of the hexagonal cross section, the cross section of lasing medium 102 can be demarcated into six equal area portions, these demarcations being illustrated by broken lines 150 in FIG. 2. Optical pumping and cooling symmetry is inherent in laser device 100 due to the central location of the optical pumping source, the circumferential nature of reflector 122 and the positioning of the first and second annular coolant channels to enable the uniform flow of coolant over interior surface 112 and the external faces. A first result of the optical pumping and cooling symmetry is that each of the six equal area portions exhibits a substantially identical temperature profile. That is, the identity between respective temperature profiles of the six area portions is achieved insofar as perfect optical pumping symmetry and perfectly uniform cooling can be achieved. Since lamp 114 and reflector 122 extend over the entire length of lasing medium 102, as do the coolant channels, the temperature profile of each such area portion is substantially identical at any perpendicular cross section along axis 104.

Figure 3:
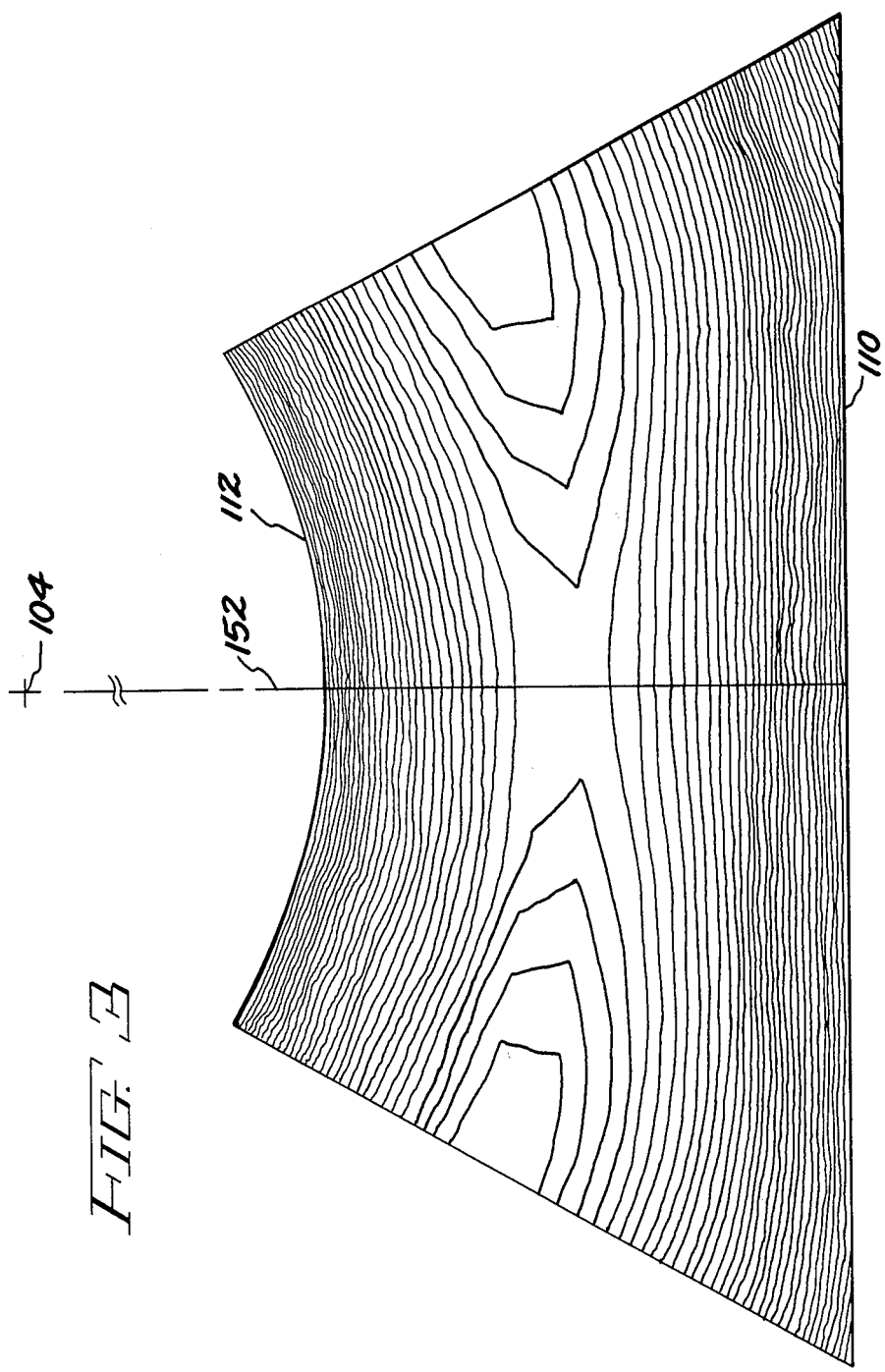
FIG. 3 is a temperature profile of an area portion of the laser device of FIG. 1.

FIG. 3 illustrates a temperature profile computed by the inventor for one such equal area portion assuming uniform generation of heat due to optical pumping by lamp 114, equal coolant temperatures in coolant channels 116 and 120, equal heat transfer coefficients for interior surface 112 and external faces 110 and uniform 100 percent reflection from reflector 122. The lines within the area portion are isotherms, i.e. loci of points having the same temperature value. For simplicity, specific temperature values are not provided in FIG. 3. However, the density of the isotherms is a direct representation of the diverse thermal regions, and hence temperature gradients, created by the coolant flow in the coolant channels. Thus, in a central region of the area portion, the temperature is fairly constant and at its highest value, this region being furthest from the coolant channels. The temperature changes more rapidly with distance as the point of evaluation moves closer to either interior surface 112 or external face 110. As a second result of the pumping and cooling symmetry, the temperature profile of the equal area portion is substantially symmetrical about a perpendicular bisector 152 of face 110.

Figure 4:
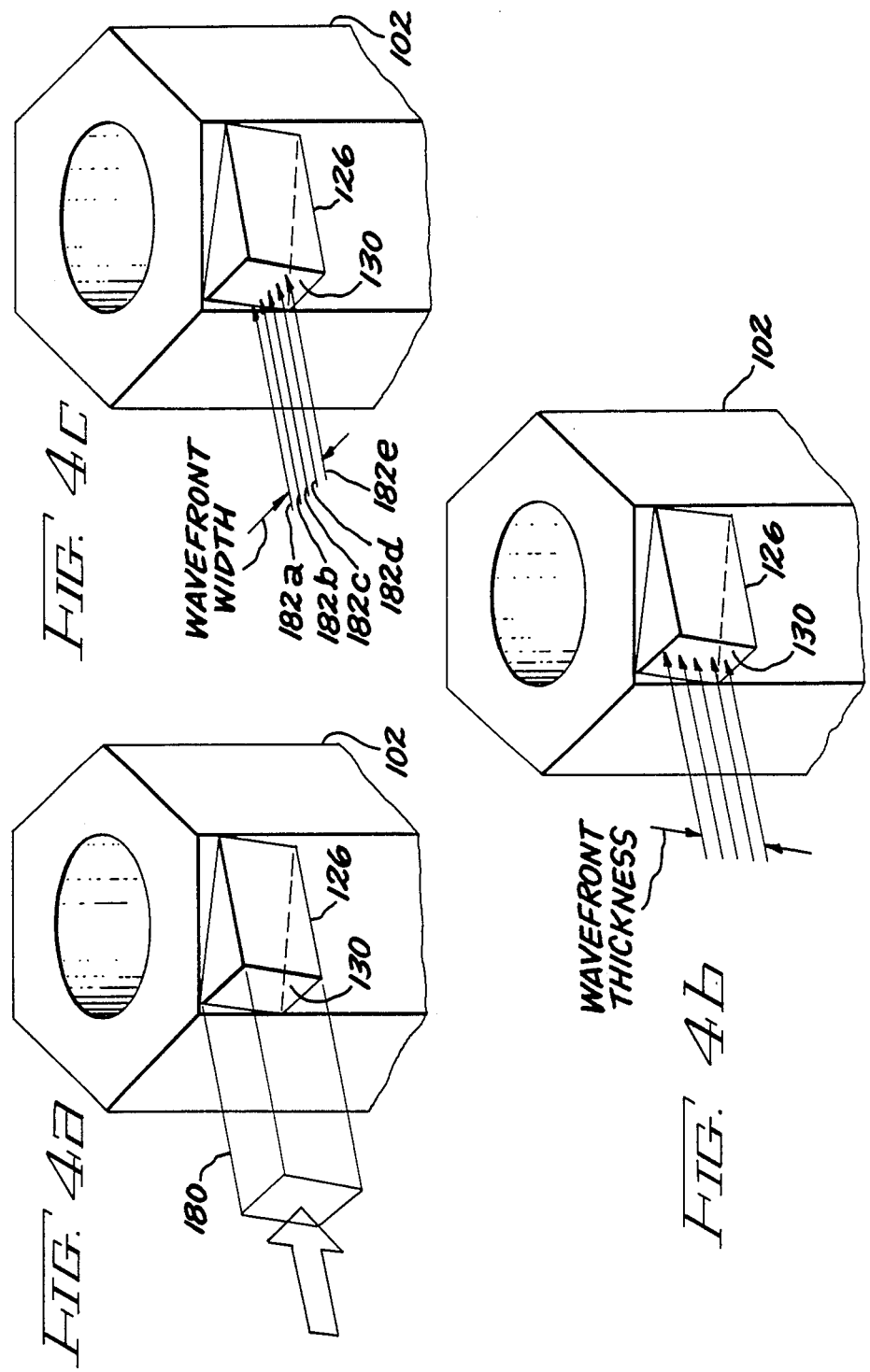
FIGS. 4a, 4b and 4c illustrate the width and thickness dimensions of a coherent light wavefront entering the laser device of FIG. 1.

As discussed above with respect to the face-pumped laser disclosed in the Martin et al. patent, wavefront distortion is a concern in the width-wise and thickness-wise dimensions of the laser beam. In Martin et al., thicknesswise distortion is minimized by multiply, internally reflecting the beam of coherent light between the optically plane surfaces of the slab bounding the slab thickness. Width-wise distortion in Martin et al. is not compensated by the internal reflection scheme and is sought to be controlled by isolating the usable portion of the lasing medium from the edges thereof. In the lasing medium of device 100, the width and thickness dimensions are illustrated in FIGS. 4a-4c. In FIG. 4a, a beam of coherent light 180 is shown entering lasing medium 102 via face 130 of prism 126. The thickness dimension of the wavefront is illustrated in FIG. 4b wherein the light rays of a single thickness plane are illustrated. As is readily apparent from the discussion above, since for any of the equal area portions the temperature distribution is substantially identical irrespective of where along the longitudinal axis a cross section of the lasing medium is considered, each ray in the single thickness plane experiences the same succession of diverse thermal regions in passing along the helical course through lasing medium 102. Therefore each ray in the thickness plane traverses the same optical path length. As a result, there is no thicknesswise distortion experienced by the coherent light beam wavefront helically traversing lasing medium 102.

The width dimension of beam 180 is illustrated in FIG. 4c wherein exemplary light rays lying in a single width plane are illustrated, those rays being designated 182a through 182e. As can be seen, the width dimension is orthogonal to the thickness dimension. Referring again to FIG. 2, the same five light rays 182a-182e of the width plane illustrated in FIG. 4c are traced through a portion of their helical course through lasing medium 102. As can been seen, ray 182c passes through the center of side 110a while rays 182b and 182d are equally spaced on either side thereof as are rays 182a and 182e. It is understood that while FIG. 2 is an end view of the lasing medium, the positions of those rays are, for illustrative purposes, projected onto the end view even though they actually progress helically along longitudinal axis 104 in a direction away from the reader. The rays 182a-182e enter through prism face 130, are transmitted through lasing medium external face 110a and fall incident on face 110b. The angle of incidence at which the rays strike face 110b is defined as θ, the angle θ being illustrated in FIG. 2 for ray 182c relative to a line 184 normal to face 110b. In accordance with the present invention, the angle θ is selected to equal the angle subtended by any one side of the regular polygon at the polygon center. In the case of the hexagonal cross section of the first illustrated embodiment, θ=60°. In order to assure total internal reflection of each ray at each external face, the angle of incidence at each such face must be greater than or equal to the critical angle $\theta_c$ defined as:

$$\theta_c = \arcsin n'/n$$

where n is the index of refraction of lasing medium 102 and n' is the refractive index of the coolant in contact with faces 110. For air cooled glass and Nd:YAG lasing mediums, the critical angles $\theta_c$ are approximately 42° and 33°, respectively. The critical angle $\theta_c$ for a water cooled Nd:YAG lasing medium is approximately 45.7°. Since in the illustrated embodiment, θ has been selected equal to 60°, total internal reflection occurs for any of these lasing medium/coolant combinations. It is noted that the critical angle $\theta_c$ for a water cooled glass lasing medium is approximately 60°, so that it is questionable whether total internal reflection would occur at each external face of lasing medium 102. If it is desired to use a liquid coolant with a glass lasing medium in the practice of the hexagonal lasing medium embodiments illustrated herein, a liquid fluorocarbon, such as FC-75, may be employed as the coolant. The critical angle $\theta_c$ for a liquid fluorocarbon cooled lasing medium is approximately 53°.

Further in accordance with a property of regular polygons and the manner in which θ is selected, 2 is equal to the internal vertex angle of the regular polygon. As a result, each width ray reflects at a point on each successive external face with the same angle of incidence. For each ray, the lateral positions of reflection points on adjacent external faces are equidistant from the intersection of those faces. The positions of reflection points on each external face are defined herein by a longitudinal position along a longitudinal direction parallel to axis 104 and a lateral position along a lateral direction orthogonal to the longitudinal direction. For example in FIG. 2, the reflection point of ray 182c is at the lateral center of each face 110. Due to the helical progress of each ray along axis 104, the locus of successive reflection points on each face forms a line along the longitudinal direction parallel to axis 104.

Figure 5:
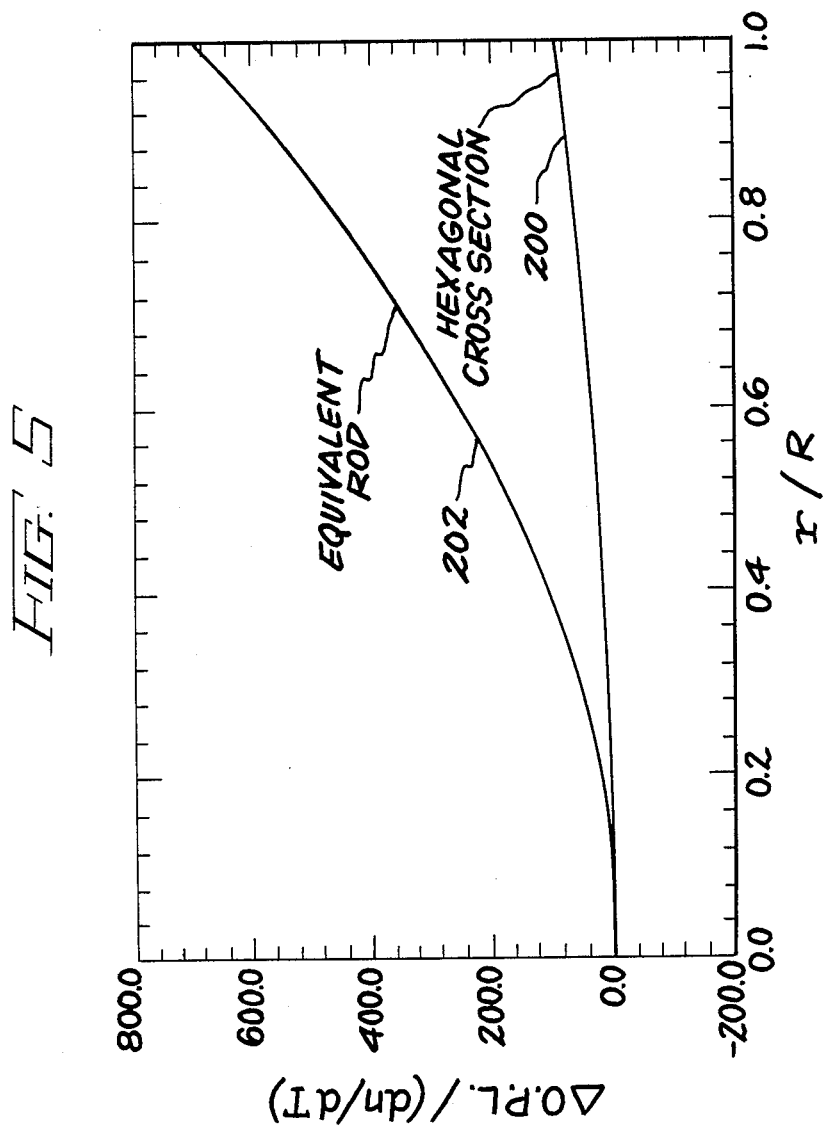
FIG. 5 is a graphical illustration of the minimal wavefront distortion experienced by a coherent light beam passing through the laser device of FIG. 1.

In view of the thermal profile symmetry of each equal area portion about the perpendicular bisector of side 110 (FIG. 3) and the above described selection of θ and by inspection of FIG. 2, a particular width ray experiences substantially the same thermal history and hence optical path length, in each successive equal area portion through which it passes. Upon further inspection of FIG. 2, and in view of the above described thermal profile symmetry, it is seen that rays 182a and 182e each experience the same thermal history as the other. Similarly, rays 182b and 182d experience the same thermal histories. As a result, in order to evaluate the optical path length differences between rays in the width dimension, it is only necessary to consider the rays entering either lateral half of side 110a. The inventor has computed the optical path length, through one equal area portion, of rays entering the lateral half side of face 110a including rays 182a, 182b and 182c, assuming the temperature distribution illustrated in FIG. 3 and a Nd:YAG lasing medium. The variance between the path lengths is illustrative of the width-wise wavefront distortion experienced by coherent light beam 180 (FIG. 4a). To graphically display the variance between the respective path lengths of these rays, a dimension parameter "r" is defined relative to center ray 182c and illustrated in FIG. 2. Thus, ray 182c is at a position r=0 while ray 182a is at a position r=R. In FIG. 5, the difference in optical path (Δ O.P.L.) length between center ray 182c (r=0) and each ray at r=r/R is plotted against r/R. To adjust the range of values plotted against the ordinate of the FIG. 5 graph, the optical path length variance Δ O.P.L. is divided by the constant dn/dT which is the change of refractive index with temperature for the Nd:YAG lasing medium.

Also in FIG. 5, a curve 200 corresponds to the hexagonal cross section of the first illustrated embodiment while a curve 202 corresponds to an equivalent rod shaped lasing medium. In order to provide a valid comparison, the equivalent rod is selected to have a length and a radius such that an equal volume would be swept by a coherent light wavefront transmitted through the rod as would be swept by the wavefront following the helical course through the hexagonal cross-sectioned medium. As is immediately apparent from the graph, the hexagonal cross section effects substantial improvement over the rod geometry with respect to width-wise wavefront distortion, thereby accomplishing a principal object of the present invention.

As previously stated, the coherent light follows a helical course between prism faces 130 and 132 (FIG. 1). This is caused by introducing the rays of the coherent light beam through face 110a at a skewed angle. Assuming the wavefront rays intersect the prism faces perpendicularly, an angle α between an edge 186 of prism face 130 and the line of intersection between faces 110a and 110f determines the skew, angle α being illustrated in FIG. 1. Prism 128 is also positioned in this fashion, angle α being defined between an edge 188 of prism face 132 and the line of intersection of faces 110a and 110b (FIG. 1). Given the longitudinal distance between prism faces 130 and 132, the angle α determines the number of helical cycles experienced by the wavefront in it helical course through lasing medium 102 from one to the other of its ends, each successive helical cycle being completed upon the arrival of the wavefront at face 110a through which it entered. The number of helical cycles is a matter of the designers choice since it is a function of the desired laser performance. Thus, the selection of both angles α and θ determine the course followed by the rays of the coherent light wavefront through the lasing medium. Note that while it is preferred herein that prisms 126 and 128 be positioned on the same face 110a of lasing medium 102, this need not be the case. The helical course of the first illustrated embodiment, and any construction of the invention utilizing a regular polygonal cross section, can extend between any pair of external faces. This result is due to the above described identity between thermal profiles of the equal area portions.

As is apparent from the discussion above and as seen in the graph of FIG. 5, while laser device 100 enjoys substantially less wavefront distortion than the equivalent rod laser, there is still some amount of width-wise wavefront distortion. The inventor has found that by adjusting the relative temperatures of the coolants flowing through coolant channels 116 and 120, and thereby the temperature profile of each equal area portion of the hexagonal cross section, the width-wise wavefront distortion can be further minimized. Curve 200 of FIG. 5 corresponds to the case in which the respective temperatures in coolant channels 116 and 120 are equal. With $T_{116}$ and $T_{120}$ respectively designating the coolant temperatures in channels 116 and 120, a factor $\phi$ is defined as:

$$\phi = \frac{T_{116} - T_{120}}{T_{120}}$$

Thus, $\phi$ represents the variation between the coolant temperatures and the inventor has computed optical path lengths over the range O to r/R for temperature profiles corresponding to different values of $\phi$. These optical path lengths are illustrated in FIG. 6 by a graph which has the same abscissa and ordinate identities as FIG. 5. Table I below lists the different values of $\phi$ and the curves in FIG. 6 respectively corresponding thereto.

TABLE I

| $\phi$ | Curve Reference Numeral |
|---|---|
| 0 | 200 |
| $3.36 \times 10^{-2}$ | 204 |
| $6.72 \times 10^{-2}$ | 206 |
| $10.08 \times 10^{-2}$ | 208 |

Curve 200 (FIG. 5), for which $\phi=0$, is reproduced in FIG. 6. As can be seen, as the temperature in coolant channel 116 is increased relative to the coolant temperature in channel 120, the wavefront distortion is further decreased. This further minimization of width-wise wavefront distortion by coolant temperature modulation is made possible by the above described symmetry of the regular polygonal cross section design. Note that in the case of the slab laser described in the Martin et al. patent, width-wise wavefront distortion can only be minimized by striving to provide both uniform pumping and cooling of the optically plane surface. In the present invention, such uniform pumping and cooling are inherent in the symmetrical design and enables the performance of coolant temperature modulation to further minimize width-wise wavefront distortion.

With respect to the first illustrated embodiment, the differences in optical path lengths experienced by different rays in the width dimension are due to their respective passages through regions having different thermal characteristics. The coolant temperature modulation performed for the first embodiment serves to minimize the optical path length differences by minimizing the differences in the thermal profiles encountered by the respective rays. A different solution to eliminating the differences in optical path lengths experienced by the width dimension rays in the first illustrated embodiment is to cause each such ray to traverse with each successive helical cycle a path previously traversed by a different one of the width dimension rays. The desired result would be all width-wise rays in the wavefront traversing the same optical path length over the entire helical course.

Figure 8:
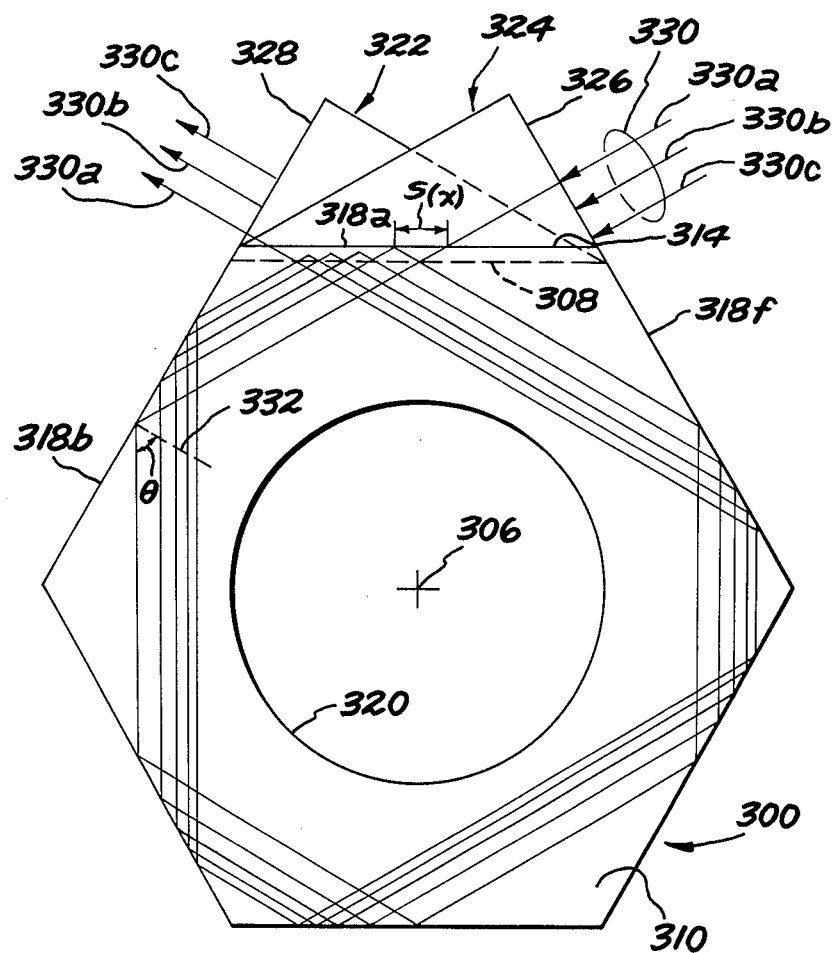
FIG. 8 is an end view of the laser device of FIG. 7.

This result is achieved in a second illustrated embodiment of the present invention illustrated in FIGS. 7a, 7b and 8. In the second illustrated embodiment, a laser device comprising the same elements as laser device 100 (FIG. 1) is constructed with the primary difference in the second embodiment residing in a modification of the lasing medium shape. Thus in FIG. 7a, only a lasing medium 300 is illustrated. The pumping source, the circumferential reflector and coolant channels are, for clarity, not shown but understood to be required for operation of the second embodiment. Lasing medium 300 includes a first end 302 having a regular polygonal cross-sectional shape in the form of a hexagon, the end 302 cross section being perpendicular to a longitudinal axis 304. Axis 304 intersects a center point 306 of the end 302 cross section. Each side of the end 302 cross section is a perpendicular distance D from center point 306, this being illustrated in FIG. 7a for a side 308. A second end 310 of lasing medium 300 has a six sided polygonal cross section perpendicular to longitudinal axis 304, that axis intersecting a center point 312 of the second end cross section. The cross-sectional shape of end 310 differs from that of end 302 only in that one side 314 is offset an additional distance "c" from center point 312. The remaining five sides of the end 310 cross section are the distance "D" from center point 312. An imaginary side 316, at the distance "D" from center point 312, is shown by a broken line in FIG. 7a to indicate the deviation of the end 310 cross section from that of a hexagon and, further, to illustrate the distance "c" offset from such a hexagonal cross section. Lasing medium 300 further comprises six external faces 318a-318f joining corresponding sides of ends 302 and 310, with face 318a joining sides 308 and 314. As is readily apparent from FIG. 7a, the effect of the offset distance "c" of side 314 is to form the modified lasing medium of the second illustrated embodiment from the lasing medium the first illustrated embodiment by canting one external face by an angle $\beta$. In FIG. 7a, an imaginary external face 319 joining side 308 to imaginary side 316 is delineated by broken lines to represent the hexagonal cross-sectional structure of lasing medium 102, so that the canting angle $\beta$ is defined relative thereto. The offset distance "c" and angle $\beta$ are related trigonometrically by a length "L" of lasing medium 300, i.e. $\tan \beta = c/L$. Lasing medium 300 includes an interior surface 320, substantially identical to that of lasing medium 102, for receiving the pumping source.

In FIG. 7b, lasing medium 300 is shown with two prisms 322 and 324 respectively positioned on external face 318a near ends 302 and 310 for introducing and extracting a coherent light beam from the lasing medium. Prisms 322 and 324 respectively include prism faces 328 and 326 through which the coherent light beam passes.

The advantage of operating a laser device employing lasing medium 300 is best understood by tracing a coherent light ray through its helical course along axis 304. FIG. 8 illustrates lasing medium 300 as viewed from end 310. A coherent light beam 330, the width of which is represented by exemplary rays 330a, 330b and 330c, is shown entering face 326 of prism 324 and exiting through face 328 of prism 322. It is understood that, like prisms 126 and 128 of the first illustrated embodiment, prisms 322 and 324 are mounted at a skewed angle, apparent in FIG. 7b, to cause the coherent light beam to follow the helical course therebetween. While, for ease of construction, each prism is mounted upon the entire lateral width of face 318a, the wavefront of the coherent light beam passing through prism face 326 is apertured to pass through no more than a first lateral half portion of external face 318a proximate a longitudinal edge of that face joining face 318f. Similarly, prism face 328 is apertured so that the wavefront beam width passing therethrough passes through no more than a second lateral half portion of external face 318a proximate a longitudinal edge thereof joining face 318b. The reason for these aperture restrictions is described hereinbelow.

The path of ray 330a is traced through four helical cycles in FIG. 8. As in the case of laser device 100, beam 330 is introduced at the same angle $\theta = 60°$ relative to side 318b, that angle between ray 330a and a line 332 normal to face 318b being indicated in FIG. 8. Ray 330a totally internally reflects successively off of faces 318b through 318f and upon returning to face 318a travels an additional offset distance beyond imaginary face 319 due to the canting of face 318a. As a result, the point of reflection on face 318a is laterally shifted by a distance s(x) relative to the point at which ray 330a initially entered through the face. The lateral shift is in addition to the longitudinal shift which occurs due to the helical progress of the ray along axis 304. This same lateral shift in reflection point is observed in the subsequent reflection points on external faces 318b through 318f. The shift distance s(x) is expressed as a function of x which, as illustrated in FIG. 7, is in turn an indication of longitudinal position along axis 304 relative to center point 306 of the end 302 cross section. Thus, x is equal to O and L respectively at ends 302 and 310. For a perpendicular distance h(x) (FIG. 7) by which face 318a is offset from imaginary face 319 at a given longitudinal position x, s(x) is given by:

$$s(x) = 2 h(x) \tan \theta,$$

where $\theta$ is the angle of incidence described above. The distance h(x) is simply given by:

$$h(x) = x \tan \beta$$

where $\tan \beta = c/L$, "c" being the offset distance of side 314. Distance h(x) can therefore be written as:

$$h(x) = xc/L$$

Substituting this expression for h(x) into the above expression for s(x) yields:

$$s(x) = 2xc \tan \theta / L$$

Thus, for a wavefront entering prism face 326, the amount of lateral shift s(x) decreases with each helical cycle as the wavefront approaches end 302, this being apparent in FIG. 8. It is also noted that in FIG. 8 the successive reflection points on face 318a move toward side 308 (of end 302) as the successive helical cycles approach end 302. This is the case since the distance h(x) decreases in the direction toward end 302.

The overall length L of lasing medium 300 and the canting angle $\beta$ are selected so that the rays of the incident wavefront entering the above described first half portion of face 318a via prism face 326 undergo, through successive helical cycles, successive lateral shifts and exit the second half portion of face 318a through prism face 328. On each successive helical cycle, each ray in the width of beam 330, except for outermost rays proximate ray 330a, traverses a path previously traversed by another ray, so that over the entire course between prisms 322 and 324, all rays traverse the same optical path and experience the same thermal history, so that the wavefront is free of width-wide distortion. This effect can only be achieved by limiting the wavefront width to the half aperture described above so that the wavefront enters and, after successive lateral shifts thereacross, exits from the same external face. Note that limiting the wavefront width to the above described half aperture results in a helically shaped portion of the lasing medium 300 volume not being utilized. This can be corrected by providing additional optical apparatus, not shown, to enable reintroduction of an exiting wavefront to traverse a helical course over the previously unutilized helically shaped volume portion of the lasing medium.

While the first illustrated embodiment of the present invention described hereinabove provides for multiple helical cycles to be followed by the coherent light beam between ends of the lasing medium, the invention is not so limited. For low power applications, the lasing medium may be provided with a short length and/or the skew angle $\alpha$ appropriately set, so that the helical course between the lasing medium ends consists of a single helical cycle. Also, as described above, the prisms of the first illustrated embodiment need not be mounted on the same helical face, so that some fraction of a helical cycle may be traversed therebetween.

The lasing mediums illustrated and described with respect to the first and second illustrated embodiments have six sides. The invention is, however, not so limited. Polygonal cross sections with more than six sides may be provided. A polygonal cross section with fewer than six sides may be provided subject to the constraint that $\theta$ is selected to be greater than or equal to $\theta_c$, where $\theta$ is derived from the characteristics of the regular polygonal cross-sectional shape selected.

While, as described above, the prisms are positioned on at least one external face of the lasing medium to enable entry and extraction of a coherent light beam, the invention is not so limited. It will be apparent to those skilled in the art that prismatic apparatus may be positioned on the ends of the lasing medium to enable such entry and exit of the coherent light beam. Note that in the absence of such end positioning of prismatic apparatus, the ends of the lasing medium need not be planar.

While the laser apparatus of the illustrated embodiments described hereinabove comprises a flow tube composed of clear glass, the invention is not so limited. As will be readily apparent to those skilled in the art, the flow tube may instead be composed of an active filter material that absorbs a portion of electromagnetic radiation incident thereon and re-emits radiation having a predetermined desirable spectral distribution.

While the laser apparatus of the embodiments illustrated herein includes a separate reflector structure mounted coaxially with the cooling tube, this need not be the case. The outer surface of the flow tube, i.e. the surface not in contact with the coolant, may instead be coated with a reflective material effective to reflect radiation back toward the lasing medium external faces. In such a case, it may be desirable to provide a metal structure coaxially with the cooling tube and in contact with the outer surface thereof to provide mechanical support.

While the prisms for introducing and extracting the coherent light beam from the lasing medium are preferably formed as an integral part of that medium, the invention is not so limited. In the alternative, the prisms may be fabricated, as separate elements, from the same lasing material of which the lasing medium is composed.

Then, the separate prisms can be bonded to the lasing medium, at appropriate locations, by use of a glass cement. A cement suitable for such bonding is disclosed in U.S. Pat. No. 4,509,175 entitled "Segmented YAG Laser Rods and Method of Manufacture".

While the laser apparatus of the embodiments illustrated hereinabove employs a flowing coolant over the external faces of the lasing medium, the invention is not so limited. A stagnant coolant, such as helium gas, may instead be employed. In such a case, flow tube 118 could be dispensed with and the stagnant coolant would be contained in the second coolant channel in direct contact with reflecting surface 124 of reflector 122. Then, during laser device operation, with reflector 122 constructed of a thermally conductive metal, such as brass, the nonreflecting back surface of the reflector could be cooled to remove heat from the stagnant coolant.

While uniform optical pumping and cooling are performed over the entire length of the lasing medium in the embodiments illustrated herein, the invention is not so limited. As will be appreciated by those skilled in the art, a selected length portion of the lasing medium, e.g. such as the portion of the lasing medium between prisms 126 and 128, may be isolated for uniform optical pumping and cooling.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A solid state lasing medium, comprising:
    a first end;
    a second end;
    said lasing medium having a longitudinal axis extending between said first and second ends and a regular polygonal cross section perpendicular to said longitudinal axis;
    optically plane external faces extending between said first and second ends and corresponding to the respective sides of said polygonal cross section; and
    an interior surface extending coaxially with said longitudinal axis to define an interior space for receiving optical pumping means;
    so that coherent electromagnetic radiation directed through said lasing medium at a selected angle totally internally reflects off of each said external face and follows a helical course between predetermined locations near said first and second ends;
    whereby, upon introducing optical pumping means into said interior space and providing means for reflecting onto said external faces electromagnetic radiation from said pumping means transmitted through said external faces, and further upon providing means for uniformly cooling said interior surface and said external faces, diverse thermal regions are created within said lasing medium, individual rays of said coherent radiation directed through said lasing medium at said selected angle passing through the diverse thermal regions to minimize the optical path length differences between the rays and thereby minimize distortion in a wavefront of said coherent radiation.

2. The lasing medium of claim 1 wherein said polygonal cross section is hexagonal.

3. The lasing medium of claim 1 wherein said interior surface has a circular cross section perpendicular to and concentric with said longitudinal axis.

4. The lasing medium of claim 1 composed substantially of neodymium:yttrium aluminum garnet.

5. The lasing medium of claim 1 composed substantially of neodymium doped glass.

6. The lasing medium of claim 1 wherein the rays lying in a plane of a thickness dimension of said coherent radiation wavefront all traverse substantially the same optical path length through said lasing medium.

7. A solid state lasing medium, comprising:
    a first end having a first N-sided regular polygonal cross section with a first center point;
    a second end having a second N-sided polygonal cross section with a second center point;
    said lasing medium having a longitudinal axis extending between said first and second center points and perpendicular to said first and second cross sections;
    each side of said first cross section a perpendicular distance D from said first center point, said second cross section differing from said first cross section only in that a first side of said second cross section is a perpendicular distance D+c from said second center point where C is an offset distance;
    optically plane external faces extending between corresponding sides of said first and second cross sections of said first and second ends respectively, a first one of said faces extending between said first side of said second cross section and the corresponding side of said first cross section; and
    an interior surface extending coaxially with said longitudinal axis to define an interior space for receiving optical pumping means;
    so that, upon introducing optical pumping means into said interior space and providing mean for reflecting onto said external faces electromagnetic radiation from said pumping means transmitted through said external faces, and further upon providing means for uniformly cooling said interior surface and said external faces, diverse thermal regions are created within said lasing medium, and individual rays of a coherent electromagnetic radiation wavefront directed through said lasing medium, at a selected angle, totally internally reflect off the successive external faces of said lasing medium and progress through successive helical cycles along said longitudinal axis between first and second predetermined locations on said first face respectively near said first and second ends, for each successive helical cycle the reflection point of each said ray on each said face being shifted in a first lateral direction relative to the reflection point thereon of the previous helical cycle; the lateral reflection point shift being in addition to a longitudinal shift thereof due to the helical progress, and further upon constraining the individual rays between a first and a second half lateral portion of said first face at said first and second locations respectively, the individual rays of said wavefront experiencing substantially the same optical path length.

8. A laser apparatus, comprising:
    a solid state lasing medium having a first and a second end and a longitudinal axis extending therebetween, said lasing medium having a regular polygonal cross section perpendicular to said longitudinal axis and optically plane external faces extending between said first and second ends, said external faces corresponding to respective sides of said polygonal cross section;

an interior surface of said lasing medium extending coaxially with said longitudinal axis to define an interior space;

optical pumping means positioned in said lasing medium interior space for uniformly impinging exciting electromagnetic radiation upon said lasing medium;

means confronting said lasing medium external faces for uniformly reflecting thereon the exciting radiation provided by said pumping means and transmitted through said external faces;

cooling means for uniformly cooling said interior surface and said external faces of said lasing medium, resulting in diverse thermal regions being created within said lasing medium; and means for directing a beam of coherent radiation through said lasing medium at a selected angle to cause a total internal reflection off of each said external face of said lasing medium and further to cause said coherent radiation to follow a helical course between predetermined locations near said first and second ends, the individual rays of said coherent radiation passing through the diverse thermal regions to average the optical path length traversed by each ray and thereby minimize distortion in a wavefront of said coherent radiation.

9. The laser apparatus of claim 8 wherein said lasing medium has a hexagonal cross section.

10. The laser apparatus of claim 8 wherein said interior surface of said lasing medium has a circular cross section perpendicular to and concentric with said longitudinal axis.

11. The laser apparatus of claim 8 wherein said lasing medium is composed substantially of neodymium:yttrium aluminum garnet.

12. The laser apparatus of claim 8 wherein said lasing medium is composed substantially of neodymium doped glass.

13. The laser apparatus of claim 8 wherein the rays lying in a plane of a thickness dimension of said coherent radiation wavefront all traverse substantially the same optical path length through said lasing medium.

14. The laser apparatus of claim 8 wherein said interior surface has a circular cross section perpendicular to said longitudinal axis;

said optical pumping means comprising a lamp having a substantially cylindrical shape, said lamp being positioned in said interior space coaxially with said longitudinal axis, so that a first annular coolant channel is formed between a cylindrical surface of said lamp and said interior surface; and said reflecting means comprising a circumferential reflector positioned coaxially with said longitudinal axis, so that a second coolant channel is formed between said reflector and said lasing medium external surfaces.

15. The laser apparatus of claim 14 further including means for modulating the relative temperatures of the coolants in said first and second coolant channels to further minimize the distortion of said coherent radiation wavefront.

16. The laser apparatus of claim 14 wherein the rays lying in a plane in a thickness dimension of said coherent radiation wavefront all traverse substantially the same optical path length through said lasing medium; and said laser apparatus further including means for modulating the relative temperatures of the coolants in said first and second coolant channels to minimize the differences between the optical path lengths of rays lying in a plane in a width dimension of said coherent wavefront.

17. A laser apparatus, comprising:

a solid state lasing medium, including:

a first end having a first N-sided regular polygonal cross section with a first center point;

a second end having a second N-sided polygonal cross section with a second center point;

said lasing medium having a longitudinal axis extending between said first and second center points and perpendicular to said first and second cross sections;

each side of said first cross section a perpendicular distance D from said first center point, said second cross section differing from said first cross section only in that a first side of said second cross section is a perpendicular distance D+c from said second center point, where C is an offset distance;

optically plane external faces extending between corresponding sides of said first and second cross sections of said first and second ends respectively, a first one of said faces extending between said first side of said second cross section and the corresponding side of said first cross section; and an interior surface extending coaxially with said longitudinal axis to define an interior space;

optical pumping means positioned in said lasing medium interior space for uniformly impinging exciting electromagnetic radiation upon said lasing medium;

means confronting said lasing medium external faces for uniformly reflecting thereon the exciting radiation provided by said pumping means and transmitted through said external faces;

cooling means for uniformly cooling said interior surface and said external faces of said lasing medium, resulting in- diverse thermal regions being created within said lasing medium; and means for directing the individual rays of a coherent electromagnetic radiation wavefront through said lasing medium at a selected angle to totally internally reflect off the successive external faces of said lasing medium and progress through successive helical cycles along said longitudinal axis between first and second predetermined locations on said first face respectively near said first and second ends, for each successive helical cycle the reflection point of each said ray on each said face being shifted in a first lateral direction relative to the reflection point thereon of the previous helical cycle, the lateral reflection point shift being in addition to a longitudinal shift thereof due to the helical progress, and further upon constraining the individual rays between a first and a second half lateral portion of said first face at said first and second locations respectively, the individual rays of said wavefront experiencing substantially the same optical path length.

* * * * *